April 14, 1964
C. FARR
3,128,746
HOG TRAP
Filed June 20, 1960
2 Sheets-Sheet 1
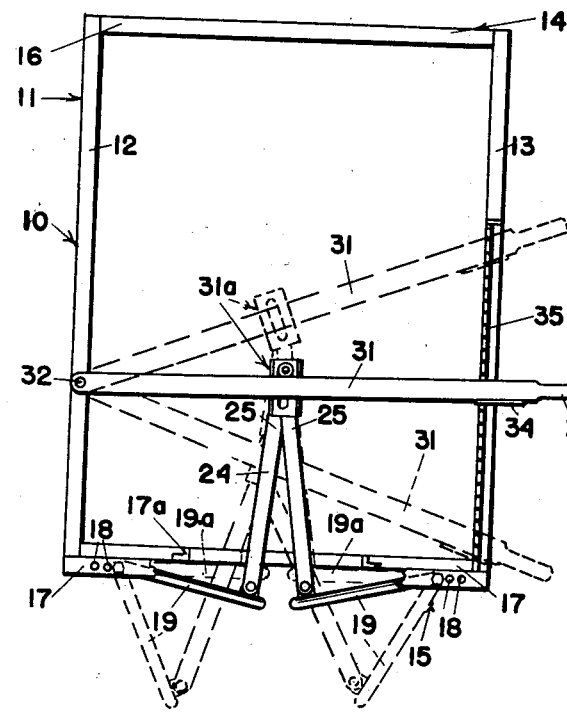
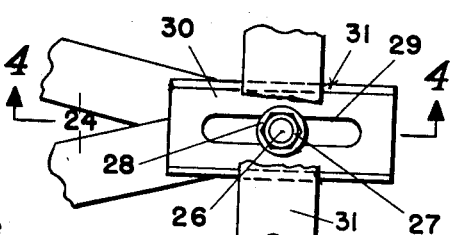
Fig.3
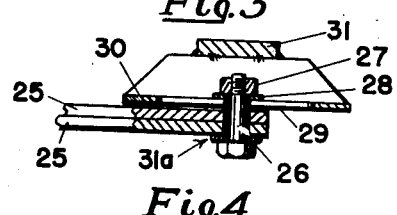
Fig.4
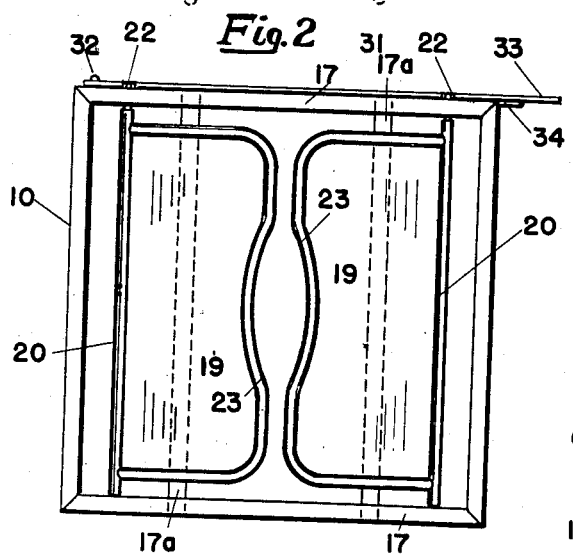
Fig.1    Fig.2
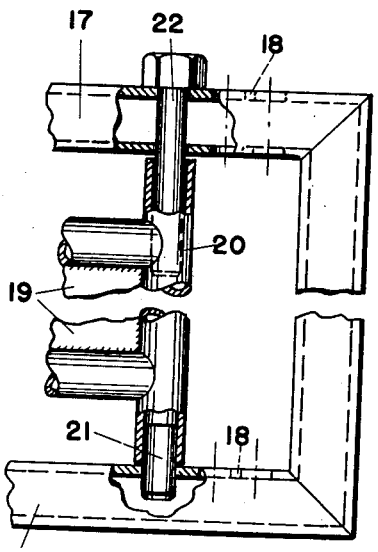
Fig.5
Cecil Farr
INVENTOR.
BY Norman B. Neff April 14, 1964

C. FARR 3,128,746

HOG TRAP

Filed June 20, 1960

Cecil Farr
INVENTOR.

BY *Norman R. Buff*

United States Patent Office 3,128,746
Patented Apr. 14, 1964

3,128,746
HOG TRAP
Cecil Farr, Albion, Wash.
Filed June 20, 1960, Ser. No. 37,242
4 Claims. (Cl. 119—99)

The present invention is a hog trap for holding hogs or other animals securely and in suitable position as, for example, while putting rings in their noses, vaccinating, testing and/or castrating.

It is an object of my present invention to provide a trap for holding hogs or other animals securely.

It is a further object of my invention to provide such a trap which can be operated by one person and by means of which one person can perform the duties mentioned above and/or others, without the aid of an assistant.

A further object of the invention lies in the provision of a hog trap which is inexpensive to construct but will be very efficient in use, easily operated, readily and quickly adjusted to accommodate animals of different sizes and unlikely to get out of repair.

Yet another object of the present invention lies in the provision in a hog chute of a pair of doors constructed and arranged to function as neck engaging members and having novel means for operating said doors.

It is yet another object of said invention to provide a device of this character wherein the neck engaging doors serve as a closure for the forward end of the trap and further to provide means for releasing the doors according to manual selection.

While I define the present invention as a hog trap and describe its operation as it relates to hogs, it should be understood that it may also be used for holding calves during the de-horning operation, for holding sheep while identification tags are being applied to their ears, or for holding any such animal during the performance of any other usual or necessary operation.

With the above primary and other objects in view as will more fully appear in the specification, the invention consists of the features of construction, the parts and combinations thereof, the mode of operation and their equivalents as hereinafter described and set forth in the claims.

In the accompanying drawings wherein like numerals are employed to designate like parts, I have shown a preferred embodiment of my present invention along with a modified species thereof.

In the drawings:

FIGURE 1 is a front elevation of my improved hog trap;

FIGURE 2 is a plan view of the same;

FIGURE 3 is an enlarged fragmentary plan of the lost motion connection;

FIGURE 4 is a cross section taken substantially on the plane indicated at line 4—4 of FIGURE 3;

FIGURE 5 is an enlarged fragmentary elevation showing a hinge for a door and having parts broken away for convenience of illustration;

Figure 6:
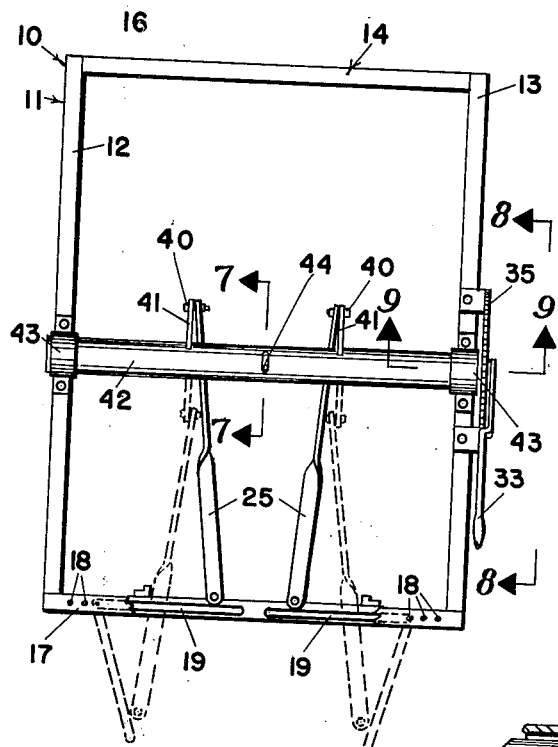
FIGURE 6 is a plan view of a modified species of hog trap.

Having reference now more particularly to the drawings, the improved hog trap is indicated in its entirety by the reference numeral 10. Generally, the trap comprises a chute 11 having laterally spaced side walls 12 and 13 which define a passageway therebetween which extends from the ingress or rearward end 14 to the egress or forward end 15. The walls 12 and 13 may be secured together in a suitable fashion to maintain their relative positions as by upper and lower cross members 16 and 17 at the rearward and forward ends.

The cross members 17 are preferably of channel or box shape in cross section and are provided with a plurality of vertically disposed apertures 18 which are axially aligned with coincident apertures 18 in the upper and lower cross members 17.

At its forward end 15 the chute is provided with a pair of opposed upright doors 19—19 which may be formed in any suitable manner to provide a closure for the forward end of the chute, but, as shown, are provided with vertically disposed tubular members 20 at their inner or hinging edges, each of which has extending from its lower end a hinge pin 21 adapted to fit into a selected aperture 18 in the lower cross member 17. A removable hinge pin 22 extends through the coincident upper aperture 18 and into the hollow upper end of the tubular member 20 as shown particularly in FIGURE 5. Thus it will be seen that the doors are hinged on vertical axes for swinging movements between the complementary positions 19a wherein they are disposed athwart of said passageway to control passage of an animal therethrough and an open position wherein the doors are substantially parallel to and at each side of the passageway.

Each door has a neck engaging notch or recess 23 formed in its outer edge, that is the edge opposed to the hinging edge, which notches complement each other to form a neck opening when the doors are in their complementary position.

Pivotally secured to the doors is linkage 24 comprising a pair of links 25, each of which is pivotally secured to a door and at their opposed ends the links 25 are pivotally interconnected by means of the bolt 26 and nut 27.

A spool 28 encircles bolt 26 and slides in a slot 29 formed in a channel member 30 welded or otherwise secured to the control bar 31. It will thus be seen that the linkage 24 constitutes means interconnecting the doors 19 for coincident swinging movement.

The control bar 31 has one end pivotally secured at 32 to the side wall 12 and the opposed free end extends over the opposed side wall 13 and terminates in the manual handle 33 for operation of the control bar. A pawl 34 is secured to the control bar and cooperates with a rack 35 which is secured to the side wall 13. It will thus be seen that the control bar 31 may be manually shifted to a selected position intermediate its extreme positions shown by broken lines of FIGURE 2.

The movement of the control bar will shift the doors 19 toward and away from the complementary positions 19a and may be positioned at any point intermediate their available travel limits by positioning the control bar 31. However, because of the lost motion connection, indicated in its entirety by the numeral 31a, and comprising members 26–30, the doors 19 are permitted a limited swinging movement which is a predetermined fraction of their available travel. In actual practice this movement is approximately 5 inches at the inner edges of the doors but may be more or less depending upon the size of the animal to be handled.

It will thus be seen that positioning the control bar 31 will enable the operator to determine the circumferential position about the respective hinge axes of the doors at which the predetermined fractional movement will be permitted.

Since most animals will attempt to escape through an opening sufficiently large for them to put their heads, it is easily seen that the operator may position the doors in such a way that the hog or other animal can pass its head between the doors. However, since the shoulders are wider than the head, the animal cannot go through and therefore will attempt to back up. In backing up, the doors will swing toward the closed position effected by movement of the animal and permitted by the lost motion connection 31a thus causing the inner edges of the doors to move toward each other and pinch behind the animals head so that the head cannot be withdrawn from between the doors. The brace bars 17a prevent movement of the doors 19 rearwardly beyond a coplanar position.

When the animal is convinced that it cannot go forwardly through the opening, it then attempts to back out of it and since it cannot back out it will be caught and held so that the operator may perform the desired function.

Since the doors operate automatically, it is not necessary for the operator to be positioned to shift the control bar to insure that the doors will catch behind the animal's head and therefore the trap can be conveniently operated by a single person.

Figure 7:
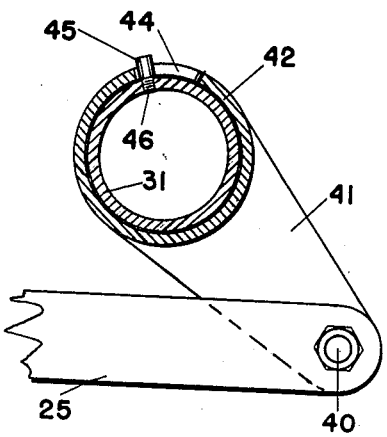
FIGURE 7 is a view taken substantially on the plane 7—7 of FIGURE 6 and showing the lost motion connection.
Figure 9:
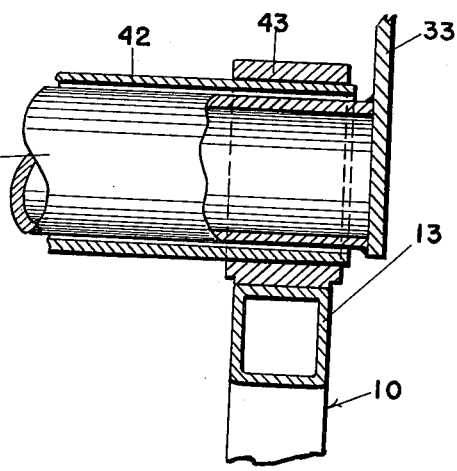
FIGURE 9 is an enlarged fragmentary view partially in section taken substantially on the plane indicated by line 9—9 of FIGURE 6.
Figure 8:
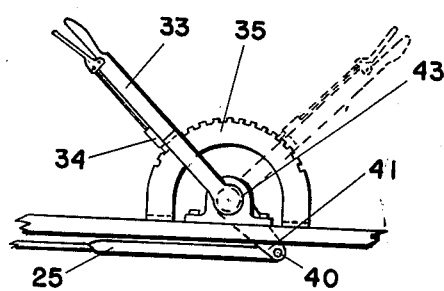
FIGURE 8 is a fragmentary elevation taken substantially on the plane indicated by line 8—8 of FIGURE 6 and looking in the direction of the arrows.

In the species disclosed in FIGURES 6-9 the corresponding parts are designated by corresponding numbers, but in this species, instead of the links 25 being pivotally secured together at the ends opposed to the doors 19, they are pivotally secured at 40 to radially extending arms 41 welded or otherwise rigidly secured to a sleeve 42 which encircles the control bar 31 journaled at 43 on the side walls 12 and 13. The sleeve 42 has a circumferential slot 44 through which extends a pin 45 threaded or otherwise secured in the control bar 31 at 46. It will thus be seen that by means of the handle 33 control bar 31 may be shifted to move the doors 19 through the lost motion connection supplied by means of the members 42-46 so that the predetermined fractional "play" or movement of the doors may be circumferentially positioned with respect to their respective axes and the links 25 connected to the arms 41 will insure coincident movement to the doors.

Having thus described my invention I claim:

1. In a hog trap having a chute defining a passageway between spaced side walls; a pair of opposed upright doors hinged for swinging movements between complementary positions athwart of said passageway to control passage therethrough, and an open position wherein the doors are substantially parallel to and at each side of said passageway, linkage pivotally interconnecting said doors for coincident swinging movement, a control bar carried by said chute for manual movements within predetermined limits, means releasably locking said bar at selected locations intermediate its limits of movement, and a lost motion connection securing said linkage to said bar for restricting the coincident swinging movements of the doors in both directions to a predetermined fraction of their available travel and at circumferential positions about their respective hinge axes according to the manual disposition of said control bar for the time being.

2. The invention of claim 1 wherein the control bar is a hand lever pivotally secured to one side wall and extends across the other side wall and terminates in a handle, a rack carried by the said last named side wall; and a pawl carried by said lever and selectively engaged with said rack to effect manual positioning of said lever.

3. The invention of claim 1 wherein the control bar is a rock shaft journaled on said chute and having a manually manipulative handle for rocking said shaft, a rack carried by said chute, a pawl effective to secure said rock shaft engageable with said rack for manual positioning of said shaft.

4. The invention according to claim 3 wherein the lost motion connection comprises a sleeve encircling said rock shaft, radial arms on the sleeve, and means effecting play of a predetermined fraction between said shaft and said sleeve.

References Cited in the file of this patent

UNITED STATES PATENTS

| | | |
|---|---|---|
| 1,135,004 | Flatley | Apr. 13, 1915 |
| 1,462,755 | Allred | July 24, 1923 |
| 2,099,956 | Flatley | Nov. 23, 1937 |